Jan. 22, 1929.  1,699,922
G. C. ROBINSON ET AL
METHOD AND APPARATUS FOR INDICATING THE CONDITION OF FOOD SUBSTANCES
Filed Aug. 24, 1927   2 Sheets-Sheet 1

Inventor
G. C. Robinson,
C. G. Harrel,

Jan. 22, 1929.                                                                  1,699,922
G. C. ROBINSON ET AL
METHOD AND APPARATUS FOR INDICATING THE CONDITION OF FOOD SUBSTANCES
Filed Aug. 24, 1927                       2 Sheets-Sheet 2
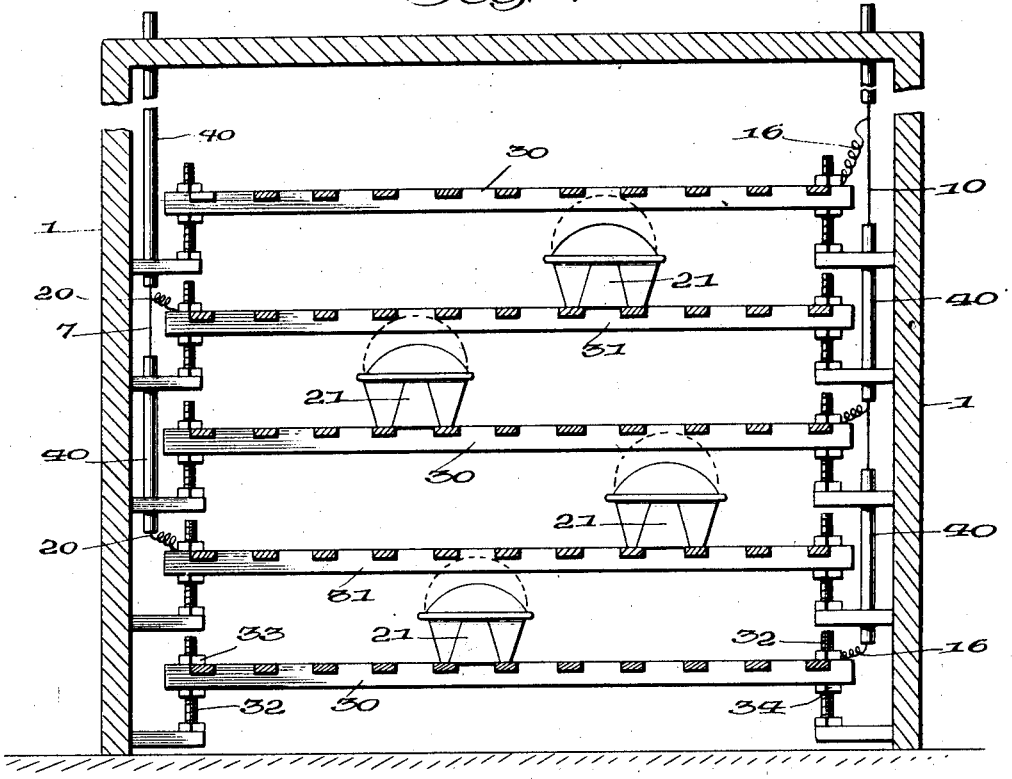
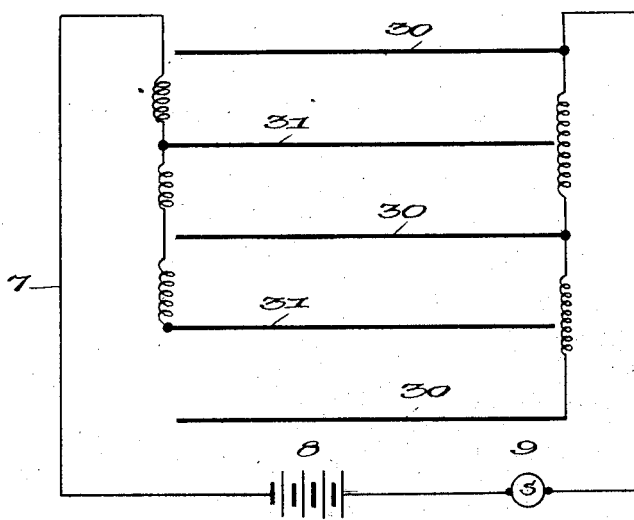
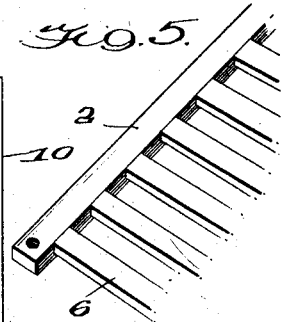
Inventor
G. C. ROBINSON,
C. G. HARREL, Patented Jan. 22, 1929.

1,699,922

UNITED STATES PATENT OFFICE.

GUY C. ROBINSON, OF DOUGLASTON, AND CHASTAIN G. HARREL, OF JAMAICA, NEW YORK, ASSIGNORS TO BAKERIES SERVICE CORPORATION, OF WILMINGTON, DELAWARE, A CORPORATION OF DELAWARE.

METHOD AND APPARATUS FOR INDICATING THE CONDITION OF FOOD SUBSTANCES.

Application filed August 24, 1927. Serial No. 215,254.

The present invention relates to an improved method and apparatus for indicating the condition of a body of food substance under treatment tending to vary a dimension of such body.

In particular, the invention relates to an apparatus for use in "proofing dough" and method of indicating when the body of dough has been expanded to a predetermined extent.

While the means hereinafter described is particularly designed for carrying out the improved method in the preparation of dough preparatory to baking the same, it is not intended to limit the invention, in its broader aspects, to such particular use. The term "food substance" as hereinafter used, is intended to cover dough or any other material which may be converted into an edible product, and in the preparatory treatment of which a dimension of such body will be varied.

It is recognized in the baker's trade that it is difficult to determine when a batch of dough is properly "proofed" or in the desired condition for introduction into the baking oven.

It will, of course, be appreciated that unless the dough is introduced into the oven very promptly after it has been expanded to a certain desired condition the resulting loaves will not be entirely satisfactory.

At present it is customary to depend upon the expert knowledge of the baker to determine when the dough should be removed from the proofing box or room and introduced into the oven.

The present invention provides a novel method and a simple but very efficient means for automatically indicating when the proofing has progressed to a predetermined extent and, therefore, it is not necessary that the attendant be so experienced as at present required if a satisfactory product is to be obtained.

In the accompanying drawing there is illustrated, more or less conventionally, a bread proofing box including an embodiment of the present invention.

Referring to the drawings:

Figure 3 is a view similar to Figure 1 illustrating a slightly different form of apparatus.

Figure 4 is a diagrammatic view.

Figure 5 is a perspective detail view.

Figure 1:
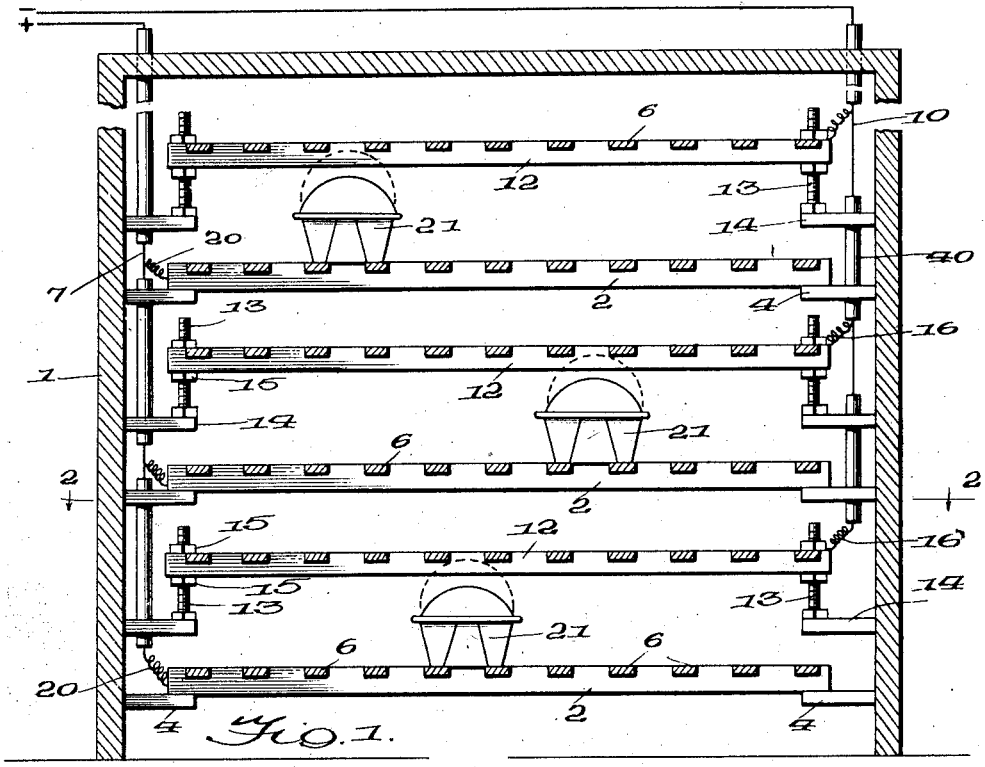
Figure 1 is a vertical sectional view through an apparatus adapted to carry out the improved method.

Referring to the drawings, in the several views of which like parts are designated by the same reference characters, 1 designates the walls of a dough proofing box or casing which is interiorly provided with a plurality of shelves 2 or supports for the pans of dough, and access to the interior of the casing is had through suitable doors 3.

As shown, the opposite walls of the casing are provided with inwardly extending members 4 upon which the pan supporting shelves 2 are positioned. The pan supports or shelves are preferably made of metal or some electric conductor, and as shown, comprise side strips which are connected by suitable slats or bars 6. Any other suitable form of shelf may, of course, be employed.

The shelves 2 are electrically connected with a conductor 7 that forms one terminal of an electric circuit including a suitable battery or another source of electrical current 8 and a signal device 9.

The walls of the casing 1 and the shelf supports 4 thereof may be made of any suitable non-conducting material in case said supports and wall are formed integral or the latter may be of non-conducting material. To the other terminal 10 of the electric circuit including the battery 8 and signalling device 9, are electrically connected a plurality of contact members 12, there being one of these positioned above each of the shelves 2.

The contact members 12 may be mounted in any suitable manner, and preferably so that they each may be adjusted vertically relative to the shelf 2 above which it is directly positioned.

In the drawing, the contact members 12 are shown as being mounted upon threaded uprights or posts 13 carried by bracket-like members 14 extending inward from the walls of the casing 1, and by means of suitable nuts 15 the contact member may be held in any desired adjusted position on the post 13. To permit of the desired vertical adjustment of the contact members 12 without interfering with the electrical connection thereof with the conductor 10, it is proposed to provide a series of coils 16 in the connection between the contact member and the conductor. The drawing also illustrates a similar arrangement at 20 between the shelves 2 and the conductor 7, so that there may be slight relative movement between the shelves and the body of the casing without danger of breaking the electrical connection between them and one terminal of the electric circuit.

In the drawing, the contact members 12 are shown as being of substantially the same form as the shelves 2, but it will be apparent that the form of the contacts may be considerably varied without departing from the invention.

Figure 2:
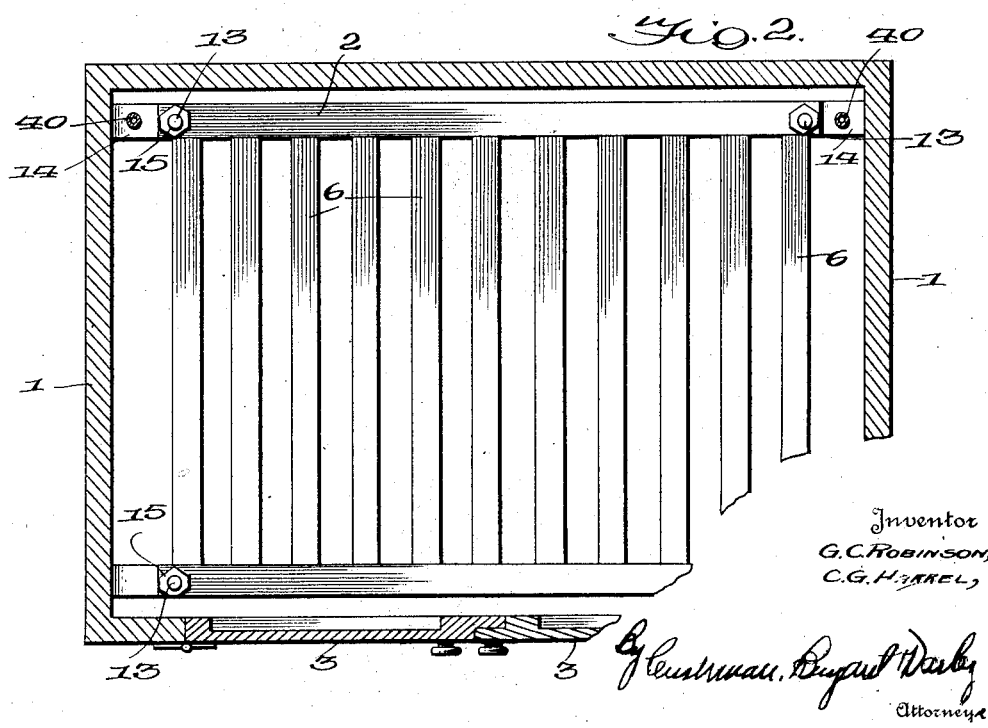
Figure 2 is a horizontal section substantially on the line 2—2 of Figure 1.

In using an apparatus such as that illustrated in Figures 1 and 2 and carrying out the method of the present invention, the pans 21 of dough will be placed upon the shelves 2, and when introduced into the casing 1 the dough in the pans will occupy appproximately the position represented by full lines in the drawings. As the dough expands to the desired predetermined degree, it will occupy the relative position indicated in dotted lines and touch the contact 12 positioned above the shelf on which the particular pan is positioned. As soon as expanding dough touches the contact 12, the circuit through the conductors 7, 10 and battery 8 will be completed and the signal 9 actuated. In this connection, it will be noted that the body of dough itself will form a portion of the electric circuit, the pan or container being in electrical connection with the shelf 2 which is directly connected to one of the terminals of the circuit.

Any suitable form of signal device may be employed, but it is preferred to use a very sensitive arrangement, so that the same will be actuated and the circuit therethrough instantly completed when the expanding dough bridges the space separating the bottom of the pan or container 21 and the contact 12 positioned thereover.

By the arrangement described, the distances separating the different shelves from the cooperating contacts 12 do not necessarily have to be uniform, but may be varied according to the particular character of dough introduced into the apparatus, and whenever the signal device is actuated, the attendant by opening the doors 3 and withdrawing one or more of the containers 21, will restore the parts so that the signal device will be again actuated when the other bodies of dough have expanded to the desired predetermined extent.

In the modification of the apparatus illustrated in Figure 3, the alternate shelves of the series serve as contacts for dough in containers supported by the next lower one of the series. In this arrangement, the alternate shelves 30, 31 are connected to the conductors 7, 10, respectively, and each shelf is adapted to be adjusted vertically, being supported on threaded posts 32 and held at the desired elevation thereon by suitable means, such as nuts 34.

In this form of the invention, pans containing dough can be positioned as shown on any of the shelves, and when the dough therein has expanded sufficiently to contact with the shelf immediately above that on which it is supported, the electric circuit will be completed, and the signal device will be actuated, as above described.

Figure 4 illustrates the wiring diagram of the embodiment of apparatus particularly shown in Fig. 3, and it will be evident that whenever the space between any two of the shelves is bridged by the expanding dough the circuit will be completed and the signal actuated.

As shown the conductors 7 and 10 are extended through tubes 40 of insulating material, which pass through the projections 4, 14 from the walls of the casing 1, but this, it will be understood, is merely an optional arrangement, and constitutes no part of the real invention.

The contact supporting posts may be insulated from the bracket like projections on the casing walls, in event that the latter are not of non-conducting material, or any other arrangement which will insure that each shelf is insulated from its cooperating contact on the alternate shelves insulated from each other may be used.

It is to be understood that in the drawings the parts are shown more or less conventionally, and that the invention is not intended to be limited to the exact arrangement shown, except as the same is specifically described in the appended claims.

We claim:

1. The method of indicating the condition of a food substance under treatment acting to vary a dimension thereof which includes causing the substance to form part of an electric circuit controlling a signal means when a changeable dimension of the substance reaches a predetermined extent.

2. The method of indicating when a body of dough has been expanded to a predetermined extent, which includes connecting a container for the body of dough with one terminal of an electric circuit controlling a signal means, and positioning the other terminal of said circuit above said container, whereby when the dough has expanded to the desired degree it will form a direct electrical connection between said terminals.

3. In an apparatus of the character described, the combination of a signal means and an electric circuit controlling said signal means and including normally spaced terminals adapted to be directly bridged by a body of food substance under treatment acting to vary a dimension of said body when such changeable dimension reaches a predetermined extent.

4. In an apparatus of the character described, the combination of a signal means and an electric circuit controlling said signal means and including normally spaced terminals, of means for supporting a body of dough in electrical connection with one terminal of said circuit and in such relation to the other said terminal as to electrically contact therewith when said body has expanded to a predetermined extent, whereby the circuit will be completed through the body of dough.

5. The combination with a signal means and an electric circuit controlling it, of a dough containing receptacle supported in electrical connection with one terminal of said circuit, and a contact, electrically connected with the other terminal of the circuit, positioned over said receptacle at a predetermined distance from the bottom thereof, substantially as and for the purpose described.

6. The combination with a signal means and an electric circuit controlling it, of means for supporting a body of dough in electrical connection with one terminal of said circuit, a contact, electrically connected with the other terminal of the circuit, arranged above said dough support, whereby the circuit will be completed through the body of dough when the latter expands sufficiently to bridge the space between the support and contact, and means for varying the vertical distance between said support and contact, for the purpose described.

7. The combination with a signal means and an electric circuit controlling it, of a shelf-like support adapted to sustain a plurality of bodies of dough and establish electrical connection between each of said bodies and one terminal of said circuit, and a contact member mounted above said support and electrically connected to the other terminal of said circuit, whereby the circuit will be completed through any of the dough bodies which is expanded sufficiently to bridge the space between the shelf and said contact.

8. The combination with a signal means and an electric circuit controlling it, of a support, of electroconductive material, for a body of dough electrically connected with one terminal of said circuit, a contact out of electrical connection with and positioned above said support to bear directly on a body of dough on the support when said body is expanded to a predetermined extent, and an electric connection between said contact and the other terminal of the circuit, for the purpose described.

9. The combination with a signal means and an electric circuit controlling it, of a support, of electroconductive material, for a body of dough electrically connected with one terminal of said circuit, a contact out of electrical connection with and positioned above said support to bear directly on a body of dough on the support when said body is expanded to a predetermined extent, an electric connection between said contact and the other terminal of the circuit, and means whereby the vertical distance between the support and contact may be varied.

10. In a means for the purpose described, the combination of a casing, two shelves of electro-conductive material, supported within the casing and vertically spaced a predetermined distance apart, a signal means, and an electric circuit controlling said means and having its terminals respectively connected with said shelves.

11. In a means for the purpose described, the combination of a casing, two shelves of electro-conductive material mounted in the casing in vertically spaced relation, means for varying the vertical distance between said shelves, a signal means, and an electric circuit controlling said means and having its terminals respectively connected with said shelves.

In testimony whereof we have hereunto set our hands.

GUY C. ROBINSON.
CHASTAIN G. HARREL.